(12) United States Patent
Kawano et al.

(10) Patent No.: US 6,447,844 B1
(45) Date of Patent: Sep. 10, 2002

(54) WATER BASE ADHESION PROMOTOR FOR POLYPROPYLENE AND METHOD FOR COATING TO POLYPROPYLENE MATERIALS USING THE PROMOTOR

(75) Inventors: Shinnosuke Kawano, Elk Grove Village, IL (US); Yasunori Komatsu, Dublin, OH (US); Kazuo Igarashi, Powell, OH (US); Michael Scott Wiseman, South Vienna, OH (US); Sawako Kamei, Dublin, OH (US); Laura McBride, Powell, OH (US)

(73) Assignees: Honda Giken Kogyo Kabushiki Kaisha, Tokyo (JP); Honda of America Mfg., Inc., Marysville, OH (US)

(*) Notice: Subject to any disclaimer, the term of this patent is extended or adjusted under 35 U.S.C. 154(b) by 0 days.

(21) Appl. No.: 09/500,657

(22) Filed: Feb. 9, 2000

Related U.S. Application Data

(63) Continuation-in-part of application No. 09/248,235, filed on Feb. 10, 1999, now Pat. No. 6,262,160.

(51) Int. Cl.$^7$ ............................................. C09D 123/28
(52) U.S. Cl. ....................................... 427/302; 427/314
(58) Field of Search ........................... 524/377; 525/77; 427/302, 314

(56) References Cited

U.S. PATENT DOCUMENTS

| | | |
|---|---|---|
| 4,681,803 A | 7/1987 | Liu .............................. 428/348 |
| 5,932,654 A | 8/1999 | Ogawa et al. ................. 525/71 |
| 6,262,160 B1 * | 7/2001 | Kawano et al. ............. 524/378 |

FOREIGN PATENT DOCUMENTS

| | | |
|---|---|---|
| EP | 0 238 327 A2 | 9/1987 |
| GB | 2 319 774 A | 6/1998 |

* cited by examiner

*Primary Examiner*—Peter D. Mulcahy

(57) ABSTRACT

The water base adhesion promotos for polypropylene comprises:
- a grafted polypropylene chloride, which includes a polypropylene chloride moiety and a maleic anhydride moiety as bonded thereto, and which has a chlorine content of 15~25 weight % and a maleic anhydride moiety content of 1~5 weight %;
- an amine-neutralized water-soluble resin;
- a wettability-improving agent; and
- water;

and is characterized by having:
- a combination ratio of 25~90 weight % as of the grafted polypropylene chloride to the total of the grafted polypopylene chloride and the amine-neutralized water-soluble resin;
- a combination ratio of 2.5~6.0 weight % as of the wettability-improving agent to the entirety of the promotor; and
- a solid content of 2~10 weight % of the entirety of the promotor. The method for coating to polypropylene materials comprises:
- a pretreatment step in which the polypropylene material is beforehand cleaned and then the above water base adhesion promotor is applied, and then dried; and
- a coating step in which a paint is coated to the material after the pretreatment step.

11 Claims, No Drawings

WATER BASE ADHESION PROMOTOR FOR POLYPROPYLENE AND METHOD FOR COATING TO POLYPROPYLENE MATERIALS USING THE PROMOTOR

This application is a continuation-in-part of copending U.S. patent application Ser. No. 09/248,235 filed on Feb. 10, 1999 U.S. Pat. No. 6,262,160 and claims the benefit thereof under 35 U.S.C. § 120.

TECHNICAL FIELD

The present invention relates to: a water base adhesion promotor for improving the paint adhesion to polypropylene materials; and a method for coating to polypropylene materials using the promoter.

BACKGROUND ART

Polyolefins such as polypropylene are comparatively cheap and has excellent properties such as formability and chemical resistance, so they are widely used in the industrial fields including the automobile industry. The amount thereof as used tends to increase, because their recycling is possible and because their prices are low. Polypropylene materials are, for example, used for exterior decoration parts of automobiles, such as bumpers and molds, and their surfaces are usually coated to both improve their weather resistance and give the design proper thereto.

The polypropylene material is inferior in wettability. Therefore, when being coated with a paint the polypropylene material undergoes the following treatments: first, a degreasing treatment with a water base cleaning agent and a pretreatment to enhance the wettability using a surface-active agent, and then coating and baking treatments of a primer, and then a coating treatment of a paint. Incidentally, the coating treatment of the primer is carried out to enhance the adhesion of paints, but, in fact, as much as about 70% of the amount of the primer as used is lost during application and therefore is not effectively used, thus resulting in high coating cost. Furthermore, there are problems in that: the primer needs to be baked after being coated, so a large baking furnace is needed and the equipment cost is therefore high.

From the above circumstances, it is desired to develop a method for coating to polypropylene materials without primer coating.

DISCLOSURE OF THE INVENTION

OBJECT OF THE INVENTION

An object of the present invention is to provide: a water base adhesion promotor to enhance the paint adhesion to polypropylene materials instead of the primer coating; and a method of coating to polypropylene materials using the promotor.

SUMMARY OF THE INVENTION

The present inventors made various examinations and experiments to solve the above problems. As a result, they attained the present invention by finding that: a composition, comprising a grafted polypropylene chloride of high adhesion to polypropylene materials, an amine-neutralized water-soluble resin of high water resistance, and a wettability-improving agent, could enhance the paint adhesion to polypropylene materials, so that the primer coating could be omitted.

That is to say, a water base adhesion promotor for polypropylene, according to the present invention, comprises:

a grafted polypropylene chloride, which includes a polypropylene chloride moiety and a maleic anhydride moiety as bonded thereto, and which has a chlorine content of 15~25 weight % and a maleic anhydride moiety content of 1~5 weight %;

an amine-neutralized water-soluble resin;

a wettability-improving agent; and water;

and is characterized by having:

a combination ratio of 25~90 weight % as of the grafted polypropylene chloride to the total of the grafted polypropylene chloride and the amine-neutralized water-soluble resin;

a combination ratio of 2.5~6.0 weight % as of the wettability-improving agent to the entirety of the promotor; and a solid content of 2~10 weight % of the entirety of the promotor.

A method for coating to polypropylene materials, according to the present invention, comprises:

a pretreatment step in which a polypropylene material is beforehand cleaned, and then the above water base adhesion promotor is applied, then dried; and a coating step in which a paint is coated to the material after the pretreatment step.

DETAILED DESCRIPTION OF THE INVENTION

Hereinafter, each component, constituting the present invention water base adhesion promotor for polypropylene, is explained in detail, and then the water base adhesion promotor for polypropylene and the method for coating to polypropylene materials are explained.

(Grafted Polypropylene Chloride)

The grafted polypropylene chloride, as used in the present invention, is a component to enhance the adhesion to polypropylene materials. The grafted polypropylene chloride is a polypropylene derivative which includes a polypropylene chloride moiety and a maleic anhydride moiety as bonded thereto, and is usually used in the form of an emulsion having the high handling property.

The polypropylene chloride moiety is a moiety comprising a polypropylene having at least one chlorine atom as a substituent. In addition, the maleic anhydride moiety is a moiety as obtained by grafting maleic anhydride, and has a cyclic acid anhydride group (deriving from maleic anhydride) and/or two free carboxyl groups.

The grafted polypropylene chloride is a product by reacting a polypropylene upon maleic anhydride and chlorine to internally graft the polypropylene, and is, for example, produced by reacting chlorine and maleic anhydride upon a polypropylene. Incidentally, whichever of chlorine and maleic anhydride may be reacted earlier than the other. The reaction with chlorine is, for example, carried out by introducing a chlorine gas into a solution including a polypropylene. In addition, the reaction with maleic anhydride is, for example, carried out by reacting maleic anhydride upon a polypropylene (or its chloride) in the presence of a peroxide.

The chlorine content in the grafted polypropylene chloride is in the range of 15~25 weight %, preferably 18~12 weight %. In the case where the chlorine content is less than 15 weight %, the melting point of the grafted polypropylene chloride is so high that the crystallization easily occurs and that the emulsification is difficult, thus resulting in depression of the storage stability of the resultant water base adhesion promotor. On the other hand, in the case where the chlorine content exceeds 25 weight %, the grafted polypropylene chloride is noncrystalline, thus resulting in depression of the adhesion and the water resistance.

The maleic anhydride moiety content in the grafted polypropylene chloride is in the range of 1~5 weight %, preferably 3~45 weight %. In the case where the maleic anhydride moiety content is less than 1 weight %, the emulsification is difficult, thus resulting in depression of the storage stability of the resultant water base adhesion promotor. On the other hand, in the case where the maleic anhydride moiety content exceeds 5 weight %, the acid anhydride group content is too much, thus resulting in depression of the adhesion and the water resistance.

The weight-average molecular weight of the grafted polypropylene chloride is not especially limited, but is preferably in the range of 20,000~100,000, more preferably 30,000~80,000. In the case where the weight-average molecular weight is less than 20,000, the promotor might swell with a solvent for a top paint, so that the adhesion might be deteriorated. On the other hand; the weight-average molecular weight exceeds 100,000, the viscosity of the resultant water base adhesion promotor might be so high that the emulsification might be difficult and that the storage stability might be low.

(Amine-neutralized Water-soluble Resin)

The amine-neutralized water-soluble resin, as used in the present invention, is a resin as water-solubilized by neutralization with an amine, and is a film-formable component having high water resistance. Incidentally, for example, water-soluble resins, which are not obtained by the amine neutralization, such as polyethylene glycol and polyvinylpyrrolidone, merely have low water resistance, because, even after film formation by drying, such water-soluble resins remain and retain its water solubility. In comparison, the amine-neutralized water-soluble resin, as used in the present invention, displays high water resistance, because it volatilizes the amine in the drying step, and thus loses the water solubility.

The amine-neutralized water-soluble resin, as used in the present invention, is not especially limited if it is a resin as neutralized with an amine, and examples thereof include products by neutralization of resins such as urethane resins, alkyd resins, and acrylic resins. These may be used either alone respectively or in combinations with each other.

Examples of the amine, as used for the above neutralization, include ammonia, triethylamine, and monoethanolamine. These may be used either alone respectively or in combinations with each other.

(Wettability-improving Agent)

The wettability-improving agent, as used in the present invention, is a component to enhance the wettability of the water base adhesion promotor upon polypropylene materials (having much water-repellency). The use of this wettability-improving agent enables a coating film, resultant from the grafted polypropylene chloride and the amine-neutralized water-soluble resin as above, to adhere well to polypropylene materials.

The wettability-improving agent is not especially limited, but examples thereof include ethylene glycol hexyl ether, dimethylpolysiloxane-polyethylene glycol block polymer (Polyflow KL-245). These may be used either alone respectively or in combinations with each other. Particularly, ethylene glycol hexyl ether improves the wettability, and further does not lower the water resistance because it volatilizes in the drying step and therefore does not remain in the resultant coating film. In comparison, materials as conventionally used to enhance the wettability, such as alkylphenylpolyethylene glycol, do not volatilize in the drying step, but remain in the coating film, thus depressing the water resistance.

(Other Components)

The water base adhesion promotor of the present invention may further comprise the following other components: resin emulsions such as acrylic emulsions, urethane emulsions, and polyvinyl chloride emulsions; inorganic pigments such as titanium white and carbon black, extenders such as talc and precipitated barium; and various organic color pigments.

(Water Base Adhesion Promotor for Polypropylene and Method for Coating)

The water base adhesion promotor for polypropylene, according to the present invention, needs to comprise the grafted polypropylene chloride, the amine-neutralized water-soluble resin, the wettability-improving agent, and water (these components are explained in detail above), and may further comprise the above other components if necessary. Conditions, such as order, for mixing these components are not especially limited.

The combination ratio of the grafted polypropylene chloride, as contained in the present invention water base adhesion promotor for polypropylene, is in the range of 25~90 weight %, preferably 30~50 weight %, of the total (the total solid content) of the grafted polypropylene chloride and the amine-neutralized water-soluble resin. In the case where the combination ratio of the grafted polypropylene chloride is less than 25 weight %, the adhesion and the water resistance are both low. On the other hand, in the case where the combination ratio of the grafted polypropylene chloride exceeds 90 weight %, the adhesion and the water resistance as well as the film formability are low.

The combination ratio of the wettability-improving agent is in the range of 2.5~6.0 weight %, preferably 3.0~4.0 weight %, of the entirety of the water base adhesion promotor. In the case where the combination ratio of the wettability-improving agent is less than 2.5 weight %, the polypropylene material crawls with the water base adhesion promotor, so uniform coating is impossible. On the other hand, in the case where the combination ratio of the wettability-improving agent exceeds 6.0 weight %, the storage stability of the water base adhesion promotor is low, and the grafted polypropylene chloride aggregates to precipitate.

The solid content of the present invention water base adhesion promotor for polypropylene is the nonvolatile matter and is in the range of 2~10 weight %, preferably 4~6 weight %, of the entirety of the water base adhesion promoter. In the case where the solid content is less than 2 weight %, the film thickness of the coating film resultant from the water base adhesion promoter is too thin, so the adhesion and the water resistance are both low. On the other hand, in the case where the solid content exceeds 10 weight %, marks of sagging are left after coating the water base adhesion promotor, so the resultant coating film has unevenness, and the appearance is therefore unfavorable.

The method of coating to polypropylene materials, according to the present invention, comprises the pretreatment step and the top coating step.

The pretreatment step includes the steps of cleaning the polypropylene material and applying the above water base adhesion promoter and then drying the material.

The cleaned polypropylene material is, for example, prepared by the following steps (1)~(3) in the pretreatment step.

(1) A step of spray-washing a polypropylene material with warm water of 60~80° C.

(2) A step of degreasing the polypropylene material with an alkaline cleaning agent after the above step (1).

(3) A step of washing the alkaline cleaning agent off the polypropylene material by spray-washing the polypropylene material with deionized water after the above step (2).

The coating film of the water base adhesion promotor is formed on the surface of the polypropylene material by applying the water base adhesion promoter onto the cleaned polypropylene material and then drying the material. This applying step may be accomplished by, for example, pouring, atomized spraying, dipping and/or showering. The choice of a given applying step for any specific part may be based on economic, process, and quality considerations. For some parts it is preferable to hold the polypropylene material upright after applying step and to then dry the material. For other parts, notably those in which the coating material may pool and/or sag after application, it is preferable to hold the polypropylene material at a slight angle, preferably about 10~20° and most preferably about 15° from the vertical during drying.

During the holding step, it is preferred to maintain an atomosphere within the environment to promote even coating after drying, For example, the holding environment may be preferably maintained at a temperature of between about 15~30° C. and about 40~70% relative humidity and most preferably between 20~25° C. and about 40~70% relative humidity. This holding step is commonly referred to as flash condition.

The method for drying after the flash condition is not especially limited, and the drying is usually carried out with ovens such as hot-air drying ovens, long-wave infrared ovens, and short-wave infrared ovens at about 60~120° C. for about 5~15 minutes. The thickness of the dried film, as obtained from the water base adhesion promoter in the above way, is preferably in the range of 0.1~1 μm.

The coating step includes the step of coating a top paint to the above material after the pretreatment step and is carried out by coating the top paint and then drying it.

The type of the top paint is not especially limited, but examples thereof include one-component melamine baking paints, two-component urethane paints, and one-component lacquer paints.

The method of coating the top paint is not especially limited, but the spray coating is preferable. The method for drying the coated top paint is not especially limited, and the drying is usually carried out with ovens such as hot-air drying ovens, long-wave infrared ovens, and short-wave infrared ovens at 70~120° C. for 20~60 minutes. The thickness of the dried film, as obtained from the top paint in the above way, is not especially limited, but is preferably in the range of 15~60 μm.

In the method for coating to polypropylene materials, the use of the above water base adhesion promotor in the pretreatment step enables the omission of the primer coating. Therefore, the productivity in the coating step is largely improved.

BEST MODE FOR CARRYING OUT THE INVENTION

Hereinafter, the present invention is more specifically illustrated by the following examples of some preferred embodiments in comparison with comparative examples not according to the invention. However, the invention is not limited to the below-mentioned examples. Hereinafter, the unit "part(s)" is "weight part(s)."

EXAMPLE 1

First, 6 parts (nonvolatile matter: 1.8 parts) of a grafted polypropylene chloride emulsion (chlorine content=16 weight %, maleic anhydride moiety content=1.5 weight %, nonvolatile matter=30 weight %), 12 parts (nonvolatile matter: 4.2 parts) of a water-soluble urethane (made by Sanyo Kasei Co., Ltd., U-Coat UWS-145, nonvolatile matter=35 weight %) (as the amine-neutralized water-soluble resin), 3 parts of ethylene glycol hexyl ether (as the wettability-improving agent), and 79 parts of water were mixed in this order under stirring, thus preparing water base adhesion promotor (1) of 100 parts in entirety. Incidentally, the ratio of (grafted polypropylene chloride)/(amine-neutralized water-soluble resin) (ratio in terms of solid content) was 30/70, and the combination ratio of ethylene glycol hexyl ether was 3 weight % of the entirety of water base adhesion promotor (1), and the solid content of water base adhesion promotor (1) was 6 weight % as determined from its nonvolatile matter.

A polypropylene material was spray-washed with warm water of 60~80° C., and then degreased by spray-washing with an alkaline cleaning agent (Surf Cleaner PL-1000, made by Nippon Paint Co., Ltd.), and then spray-washed with deionized water of room temperature to wash the alkaline cleaning agent off, thus preparing a washed polypropylene material. This polypropylene material was immersed into water base adhesion promotor (1), and then left standing upright at room temperature for 1 minute, and then dried at 80° C. for 10 minutes. Next, an isocyanate curing type polyester resin paint (R-763, made by Morton Nippon Coatings Co., Ltd.) (as the top paint) was spray-coated to the above polypropylene material, and the coated paint was then dried at 80° C. for 40 minutes, thus obtaining coated product (1). Incidentally, the dried-film thickness was in the range of 15~25 μm.

The properties of water base adhesion promotor (1) were evaluated by the following methods. The results thereof are shown in Table 1.

(Evaluation Method)
1. Adhesion

A cross-cut test was cared out for the coated product in accordance with JIS K5400. First, 100 cross-cuts of 2 mm×2 mm were prepared to carry out the cellophane tape peeling test, and the evaluation was made on the following evaluation standard:

○: no peeling-off was seen;
x: one or more cross-cuts peeled off.

2. Water Resistance

The coated product was immersed into warm water of 80° C. for 3 hours, and water on the surface was then wiped off. Thereafter, the coated product was left for 1 hour, and the above adhesion evaluation was then carried out. The evaluation standard was the same as that for the adhesion.

3. Appearance

A polypropylene material of 7.5 cm×10 cm was prepared, and then treated with the water base adhesion promotor, and then stood upright, and then dried at 80° C. for 30 minutes, thus evaluating whether a sagging mark was seen or not with the eye on the following evaluation standard:

○: no sagging mark;
x: a sagging mark was seen.

4. Storage Stability

A polypropylene material was immersed into the water base adhesion promotor as had been stored at room temperature for 1 month, thus evaluating whether an aggregate was seen or not with the eye on the following evaluation standard:

○: no aggregate,
x: an aggregate was seen.

EXAMPLES 2~4 AND COMPARATIVE EXAMPLES 1~7

Water base adhesion promotors (2)~(4) and comparative water base adhesion promoters (1)~(7) were prepared to evaluate their properties in the same way as of Example 1 except that the type and the combination amount of the grafted polypropylene chloride emulsion and the combination amounts of the water-soluble urethane and the ethylene glycol hexyl ether were changed to those as shown in Tables 1 and 2. Tables 1 and 2 further show the ratio of (grafted polypropylene chloride)/(amine-neutralized water-soluble resin) (ratio in terms of solid content) and the combination ratio and the solid content of the ethylene glycol hexyl ether.

TABLE 1

|  |  | Example |  |  |  |
|---|---|---|---|---|---|
|  |  | 1 | 2 | 3 | 4 |
| Water base adhesion promotor (parts)*1 | Grafted polypropylene chloride (CPO) | 1.8 | 1.5 | 4.0 | 4.0 |
|  | Water-soluble urethane (AU) | 4.2 | 1.5 | 6.0 | 1.0 |
|  | Ethylene glycol hexyl ether (EGHE) | 3.0 | 5.0 | 3.0 | 4.0 |
| Chlorine content of CPO (weight %) |  | 16 | 21 | 25 | 21 |
| Maleic anhydride content of CPO (weight %) |  | 1.5 | 4.5 | 1.0 | 4.5 |
| CPO/AU (ratio in terms of solid content) |  | 30/70 | 50/50 | 40/60 | 80/20 |
| Combination ratio of EGHE (weight %) |  | 3 | 5 | 3 | 4 |
| Solid content (weight %) |  | 6 | 3 | 10 | 5 |
| Evaluation results | Adhesion | ○ | ○ | ○ | ○ |
|  | Water resistance | ○ | ○ | ○ | ○ |
|  | Appearance | ○ | ○ | ○ | ○ |
|  | Storage stability | ○ | ○ | ○ | ○ |

*1Amount of each component in 100 weight parts of water base adhesion promotor; the balance is water.

TABLE 2

|  |  | Comparative Example |  |  |  |  |  |  |
|---|---|---|---|---|---|---|---|---|
|  |  | 1 | 2 | 3 | 4 | 5 | 6 | 7 |
| Water base adhesion promotor (parts)*1 | Grafted polypropylene chloride (CPO) | 1.0 | 9.5 | 1.8 | 1.8 | 1.8 | 0.5 | 6.0 |
|  | Water-soluble urethane (AU) | 4.0 | 0.5 | 4.2 | 4.2 | 4.2 | 0.5 | 1.0 |
|  | Ethylene glycol hexyl ether (EGHE) | 3.0 | 3.0 | 3.0 | 3.0 | 7.0 | 3.0 | 3.0 |
| Chlorine content of CPO (weight %) |  | 21 | 16 | 27 | 21 | 21 | 21 | 21 |
| Maleic anhydride content of CPO (weight %) |  | 4.5 | 1.5 | 1.5 | 7.0 | 4.5 | 4.5 | 4.5 |
| CPO/AU (ratio in terms of solid content) |  | 20/80 | 95/5 | 30/70 | 30/70 | 30/70 | 50/50 | 50/50 |
| Combination ratio of EGHE (weight %) |  | 3 | 3 | 3 | 3 | 7 | 3 | 3 |
| Solid content (weight %) |  | 5 | 10 | 6 | 6 | 6 | 1 | 12 |
| Evaluation | Adhesion | x | x | x | x | ○ | x | ○ |

TABLE 2-continued

|  |  | Comparative Example | | | | | | |
|---|---|---|---|---|---|---|---|---|
|  |  | 1 | 2 | 3 | 4 | 5 | 6 | 7 |
| results | Water resistance | x | x | x | x | ○ | x | ○ |
|  | Appearance | ○ | ○ | ○ | ○ | ○ | ○ | x |
|  | Storage stability | — | — | — | — | x | — | — |

*1 Amount of each component in 100 weight parts of water base adhesion promotor; the balance is water.

<Evaluation Results>

Examples 1~4 all provide excellent results with regard to the adhesion, the water resistance, the appearance, and the storage stability, and enable the omission of the conventional primer coating step. Comparative Examples 1 and 2 provide inferior results with regard to the adhesion and the water resistance, because the combination ratio of the grafted polypropylene chloride is out of the claimed range. Comparative Example 3 provides inferior results with regard to the adhesion and the water resistance, because the chlorine content of the grafted polypropylene chloride is too large. Comparative Example 4 provides inferior results with regard to the adhesion and the water resistance, because the maleic acid moiety content is too large. Comparative Example 5 provides inferior results with regard to the storage stability, because the combination ratio of the ethylene glycol hexyl ether is too large. Comparative Example 6 provides inferior results with regard to the adhesion and the water resistance, because the coating film resultant from the water base adhesion promotor is thin due to too small solid content. Comparative Example 7 provides inferior results with regard to the appearance, because the coating film resultant from the water base adhesion promotor is thick due to too large solid content.

INDUSTRIAL APPLICATION

The use of the present invention water base adhesion promotor for polypropylene in the pretreatment step prior to coating of polypropylene materials enables the omission of the primer coating, and further, provides excellent results with regard to the adhesion of the paint and the water resistance and appearance of the coating film.

The present invention method for coating to polypropylene materials involves the use of the above water base adhesion promotor in the pretreatment step and therefore enables the omission of the primer coating and the great improvement of the productivity of the coating step. In addition, in this method, the water base adhesion promotor that does not remain on the polypropylene material can be recovered and recycled through the process, providing economical advantages to the process.

What is claimed is:

1. A method for coating to polypropylene materials, comprising:

pretreating in which a polypropylene material is beforehand cleaned, and then applying thereto a water base adhesion promotor comprising:

a grafted polypropylene chloride, which includes a polypropylene chloride moiety and a maleic anhydride moiety as bonded thereto, and which has a chlorine content of 15~25 weight % and a maleic anhydride moiety content of 1~5 weight %;
an amine-neutralized water-soluble resin;
a wettabilty-improving agent; and
water;

being characterized by having:
a combination ratio of 25~90 weight % as of the grafted polypropylene chloride to the total of the grafted polypropylene chloride and the amine-neutralized water-soluble resin;
a combination ratio of 2.5~6.0 weight % as of the wettability-improving agent to the entirety of the promotor; and
a solid content of 2~10 weight % of the entirety of the promotor;

drying the pretreated material; and
coating in which a paint is coated to the pretreated material after the preheating.

2. The method of claim 1 wherein said wettability-improving agent is ethylene glycol hexyl ether.

3. The method of claim 1 wherein said applying comprises pouring, atomized spraying, dipping and/or showering.

4. The method of claim 1 further comprising holding the pretreated material prior to said drying.

5. The method of claim 4 wherein said holding is accomplished in an environment having a temperature of between about 15~30° C. and a relative humidity of between about 40~70%.

6. The method of claim 4 wherein said holding is accomplished in an environment having a temperature of between about 20~25° C. and a relative humidity of between about 40~70%.

7. The method of claim 4 wherein said pretreated material is held in a vertical position.

8. The method of claim 4 wherein said pretreated material is held at an angle of between about 10~20° from the vertical.

9. The method of claim 1 wherein adhesion promotor that does not remain on said polypropylene material after said applying is recovered and recycled.

10. The method of claim 1 wherein said drying is accomplished at a temperature of between about 60~120° C.

11. The method of claim 10 wherein said dying is accomplished in about 5~15 minutes.

* * * * *

UNITED STATES PATENT AND TRADEMARK OFFICE
Certificate

Patent No. 6,447,844 B1                                                                 Patented: September 10, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Yasunori Komatsu, Dublin, OH; Kazuo Igarashi, Powell, OH; Michael Scott Wiseman, South Vienna, OH; Sawako Kamei, Dublin, OH; and Laura McBride, Powell, OH.

Signed and Sealed this Sixteenth Day of December 2003.

DAVID W. WU
*Supervisory Patent Examiner*
Art Unit 1713

UNITED STATES PATENT AND TRADEMARK OFFICE
CERTIFICATE OF CORRECTION

PATENT NO. : 6,447,844 B1  
DATED : September 10, 2002  
INVENTOR(S) : Kawano et al.

It is certified that error appears in the above-identified patent and that said Letters Patent is hereby corrected as shown below:

Column 10,
Line 32, "preheating" should read -- pretreating --.

Signed and Sealed this

Thirty-first Day of August, 2004

JON W. DUDAS  
*Director of the United States Patent and Trademark Office*